March 16, 1954     P. H. MAGEE     2,672,302
ANTIBACKLASH ATTACHMENT FOR FISHING REELS
Filed Nov. 6, 1952
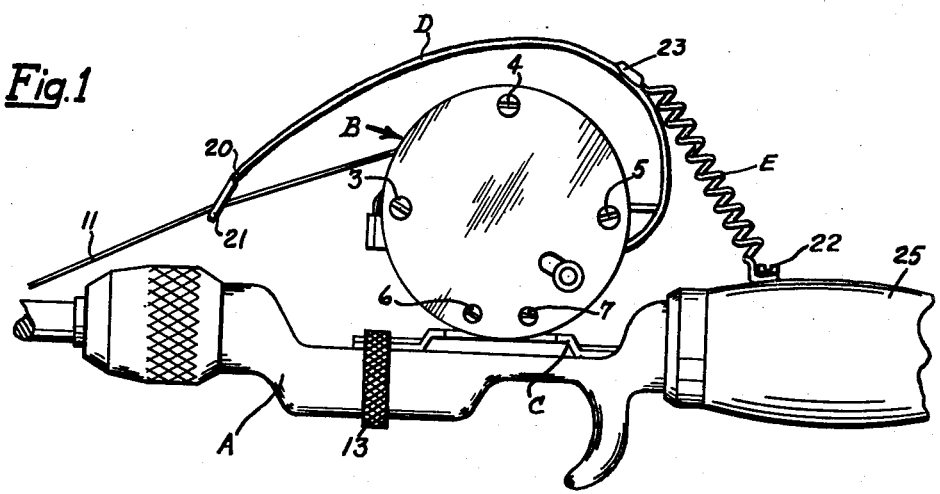
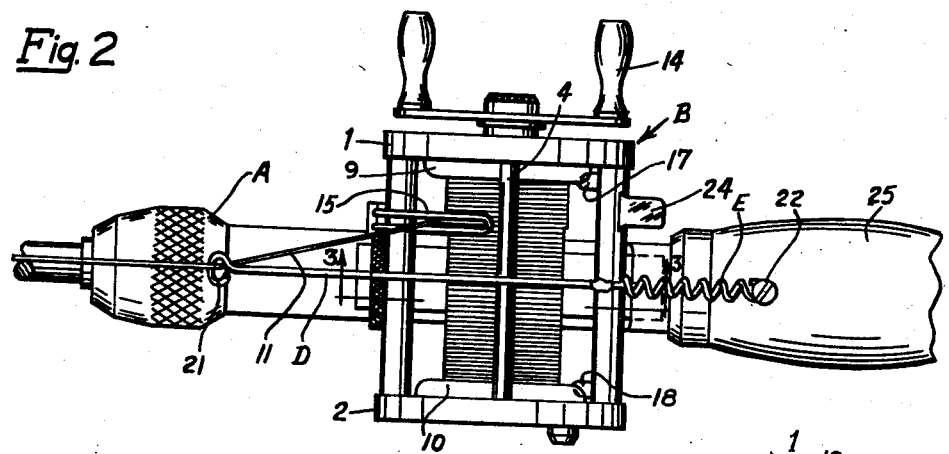
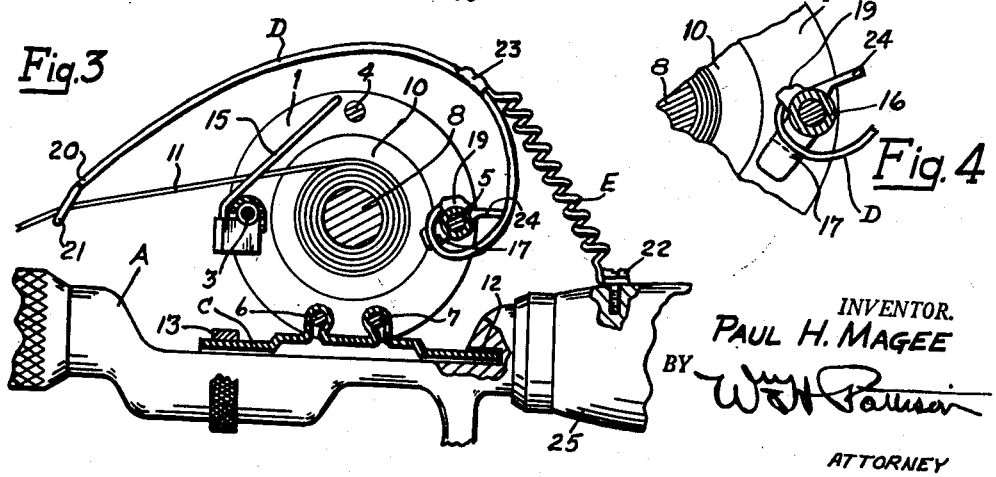
INVENTOR.
PAUL H. MAGEE
ATTORNEY

Patented Mar. 16, 1954

2,672,302

UNITED STATES PATENT OFFICE 2,672,302

ANTIBACKLASH ATTACHMENT FOR FISHING REELS

Paul H. Magee, Rockville, Md.

Application November 6, 1952, Serial No. 319,078

2 Claims. (Cl. 242—84.5)

The present invention relates to an antibacklash attachment for fishing reels, the desirability of which is well known to fishermen for the reason that when a line is cast, if the running or rotation of the fishing reel spool has not stopped as soon as the plug or bait hits the water, the slackening of the line would cause over-running of the line by the spool which results in a snarling or tangling of the line. Should a fish take the bait or lure under these conditions the angler will be unable to either slack the line or reel in the fish and line due to the tangled and snarled condition of the line caused by the backlash or over-running of the reel spool.

It being obviously desirable to overcome the foregoing, the primary object of the invention is to provide an antibacklash attachment for a fishing reel.

Another object of the invention is to provide an antibacklash attachment which embodies brakes which will automatically come into operation and stop the running of the reel as soon as the fishing line is slackened.

A still further object of the invention is the provision of such an attachment which can be readily, quickly and cheaply applied or attached to standard reels without modification thereof and without the exercise of any special skill or the use of any special tools.

A still further object of the invention is the provision of such an attachment which is extremely simple of construction yet strong, durable, and efficient in operation, and which can be manufactured and sold at a relatively small price, thus making the attachment widely available to anglers.

A still further object of the invention is the provision of an antibacklash device which when incorporated into reels as originally manufactured makes it possible to manufacture reels at a reduced cost in that internal tension arrangements commonly provided in reels can be eliminated.

Other objects and advantages of the invention will be readily apparent to anglers and will be understood from a reading of the following description in the light of the accompanying drawings.

In the drawings:

Fig. 1 is a view in side elevation of a fishing rod and reel embodying the present improved antibacklash attachment.

Fig. 2 is a top plan view thereof.

Fig. 3 is a vertical sectional view on the line 3—3 of Fig. 2, looking in the direction indicated by arrows, the reel base also being shown in section as is a portion of the rod.

Fig. 4 is a fragmentary enlarged view illustrating the antibacklash brake in a non-braking position.

Having reference now to the drawings, A designates a fishing rod of any common and well known form, and B can be any conventional fishing reel.

The rod and reel specifically form no part of the present invention and will be referred to and described only in sufficient detail to an understanding of the present invention.

The reel embodies a frame having end plates 1 and 2 which are secured in spaced parallel relationship by a series of rods 3, 4, 5, 6 and 7. The reel comprises a spool 8 provided at its ends with heads 9 and 10. Any conventional kind of fishing line 11 is wound about the spool. The reel is secured to the rod by a plate C one end of which is secured in the rod at 12, while the other end is secured to the rod by a sliding ring or clamp 13.

The reel spool is rotatable by any suitable crank handle 14 which in conventional reels is provided with suitable gearing, which in this instance is not illustrated.

The fishing line 11 is coiled on the spool and for the purpose of spreading the line there is a conventional traverse line guide 15 which is driven in any one of the well known manners common to reels but which is not illustrated.

The foregoing describes in broad terminology a conventional rod and reel and is specifically described and illustrated to an extent sufficient to an understanding of the present improved attachment associated therewith.

A tube 16 telescopically receives the frame rod 5 and is freely rotatable thereon. At each of its ends this tube at its forward side, that is on its side opposing the reel spool, is provided with a brake shoe which are designated 17 and 18. These shoes, as is clearly apparent from Figs. 2 and 3 of the drawings, are adapted to, and under certain conditions, engage the heads 9 and 10 of the spool.

An arm D, preferably but not necessarily composed of a resilient material, has an end secured at the point 19 to the tube 16. From this point the arm extends under the tube and upwardly and forwardly over the reel spool and has its end 20 terminating forwardly of the spool and provided with a line receiving eye 21 through which the fishing line 11 passes on its way to the outer end of the fishing pole.

A coil spring E has one end secured to the fishing rod, preferably the handle thereof, as at 22 and its other end secured to the arm D as at 23.

In operation, the brake shoes are normally held in braking engagement with the spool heads due to the tension exerted by the spring E by reason of the fact that this spring tends normally to swing the arm D rearwardly which results in a clockwise rotation of the tube 16, viewing Fig. 3 of the drawings, which moves the brake shoes into engagement with the reel spool heads. Immediately, however, a cast is made, tension is exerted upon the fishing line 11 and as the coil spring E is not strong this tension on the line tends to pull the end 20 of the arm downwardly as illustrated in Figs. 1 and 3, which results in swinging the arm D forwardly and causes the arm to rotate the tubing 16 in an anti-clockwise direction, thus moving the brake shoes into a non-braking position in respect to the reel spool heads. Immediately the bait or lure strikes the water, tension upon the fishing line is released, that is becomes nil, and the spring E automatically swings the brake operating arm D rearwardly thus rotating the tube in a clockwise position and bringing the brakes into operation upon the reel spool heads, thus stopping the run of the line and automatically preventing backlash and therefore automatically preventing tangling or snarling of the line.

It has been found desirable to provide a manual means for applying a braking action to the reel spool, particularly if there is no internal tension means provided in the reel, and to this end a thumb piece 24 is provided on the tube 16 and is conveniently positioned to the hand of an angler who is grasping the fishing rod handle 25.

With the present invention adjustments required in reels when changing from light to heavier weight plugs or bait is eliminated.

Making the arm D resilient, as for instance of wire, has the advantage that the arm more readily follows the line from side to side when the line is winding or unwinding and should the reel be dropped a rigid arm would quite possibly be broken or bent, whereas if the reel should fall upon a resilient arm the arm would absorb the shock and spring back into proper position. Additionally, a rigid arm would require greater care in handling and packing the reel for shipment because it would not withstand rough usage.

The construction illustrated and described is considered the preferred embodiment of the inventive concept, but departures therefrom in the specific construction and arrangement can be made without departing from the invention which is to be limited only by the scope of the hereinafter and following claims.

What I claim is:

1. In a fishing rod and reel of the type wherein the reel embodies a headed spool rotatable within a frame having an end plate behind each head of the spool and a series of rods spaced around the spool interconnecting the plates, an antibacklash device comprising: a tube freely rotatably mounted on one of said frame rods which is positioned behind the spool, the tube telescopically receiving and enclosing substantially all of the length of the rod which extends between the reel end plates, a brake shoe carried by each end of the tube and extending radially inwardly therefrom and adapted to engage a spool head, an arm connected to the tube at a point midway the length thereof, the free end of the arm extending forwardly from the tube and over the spool in spaced relationship thereto and provided at its free end with an eye adapted to receive the fishing line on its passage over the spool to the outer end of the pole, resilient means having one end connected to the rod and its other end to the arm and normally tending to swing the arm rearwardly to rotate the tube and move the brake shoes forwardly into braking contact with the spool heads, and the arrangement being such that a taut fishing line acts to pull downwardly on and swing the arm forwardly against the tension of the resilient means and thereby rotate the tube to move the brake shoes rearwardly to a non-braking position.

2. In a fishing rod and reel of the type wherein the reel embodies a headed spool rotatable within a frame having an end plate behind each head of the spool and a series of rods spaced around the spool interconnecting the plates, an antibacklash device comprising: a tube freely rotatably mounted on one of said frame rods which is positioned behind the spool, the tube telescopically receiving and enclosing substantially all of the length of the rod which extends between the reel end plates, a brake shoe carried by each end of the tube and extending radially inwardly therefrom and adapted to engage a spool head, a resilient arm rigidly connected to that side of the tube which opposes and is adjacent the spool and at a point midway the length of the tube, the free end of the arm extending rearwardly under the tube and upwardly behind the tube in spaced relationship thereto and forwardly over the tube and having its free end disposed forwardly of the spool and provided with an eye adapted to receive the fishing line on its passage from the spool to the outer end of the pole, resilient means having one end connected to the rod handle and its other end to the arm at a point forward of the tube and normally tending to swing the arm rearwardly to rotate the tube and move the brake shoes forwardly into braking contact with the spool heads, and the arrangement being such that a taut fishing line acts to pull downwardly on and swing the arm forwardly against the tension of the resilient means and thereby rotate the tube and move the brake shoes rearwardly to a non-braking position.

PAUL H. MAGEE.

References Cited in the file of this patent

UNITED STATES PATENTS

| Number | Name | Date |
| --- | --- | --- |
| 1,835,384 | Dills | Dec. 8, 1931 |
| 2,059,519 | Harris | Nov. 3, 1936 |
| 2,374,551 | Margis, Jr. | Apr. 24, 1945 |
| 2,555,604 | Pies | June 5, 1951 |
| 2,579,532 | Allen | Dec. 25, 1951 |